United States Patent
Wieclawski

(10) Patent No.: US 7,823,977 B2
(45) Date of Patent: Nov. 2, 2010

(54) VEHICLE SEAT ARRANGEMENT

(75) Inventor: Stanislaw Andrzej Wieclawski, Riedstadt (DE)

(73) Assignee: Lear Corporation, Southfield, MI (US)

( * ) Notice: Subject to any disclaimer, the term of this patent is extended or adjusted under 35 U.S.C. 154(b) by 233 days.

(21) Appl. No.: 12/113,522

(22) Filed: May 1, 2008

(65) Prior Publication Data

US 2008/0296949 A1 Dec. 4, 2008

(30) Foreign Application Priority Data

May 31, 2007 (DE) .................. 10 2007 025 327

(51) Int. Cl.
*B60N 2/02* (2006.01)

(52) U.S. Cl. .................... 297/341; 297/344.1

(58) Field of Classification Search ............ 297/344.11, 297/344.1, 378.14, 341, 340; 248/429

See application file for complete search history.

(56) References Cited

U.S. PATENT DOCUMENTS

| | | | |
|---|---|---|---|
| 6,752,461 B2 * | 6/2004 | Hamelin | 297/378.12 |
| 7,025,419 B2 | 4/2006 | Sasaki et al. | |
| 7,533,937 B2 * | 5/2009 | Becker et al. | 297/378.14 |
| 2004/0140704 A1 * | 7/2004 | Abdella et al. | 297/344.11 |

FOREIGN PATENT DOCUMENTS

| | | |
|---|---|---|
| DE | 3828223 C1 | 9/1989 |
| DE | 10043404 A1 | 3/2002 |
| DE | 10102333 B4 | 1/2005 |
| DE | 10106044 B4 | 1/2005 |
| DE | 102004021673 A1 | 12/2005 |

OTHER PUBLICATIONS

English Abstract for DE10043404A1.

* cited by examiner

*Primary Examiner*—Milton Nelson, Jr.
(74) *Attorney, Agent, or Firm*—Brooks Kushman P.C.

(57) ABSTRACT

A vehicle seat arrangement includes a rail and a seat body slidably mounted on the rail having a seat component and a backrest pivotally connected to the seat component. The backrest pivots between a generally upright position and a forward tilted entry position. The seat body moves between a sitting position and an entry position. A blocking member obstructs the seat body from moving rearward of the sitting position. A locking mechanism moves between a locked position that restrains the seat back in the forward tilted entry position and a release position that releases the seat back to return to the generally upright position. The backrest acts as a lever such that a force applied to the backrest in a direction toward the sitting position is transferred through the backrest to the locking mechanism moving the locking mechanism from the locked position to the released position.

20 Claims, 6 Drawing Sheets

VEHICLE SEAT ARRANGEMENT

CROSS-REFERENCE TO RELATED APPLICATIONS

This application claims priority to German Application No. 10 2007 025 327.5, filed on May 31, 2007, the disclosure of which is hereby incorporated in its entirety.

BACKGROUND OF THE INVENTION

1. Field of the Invention

This invention relates to a vehicle seat arrangement, having a seat bottom and a backrest.

2. Background Art

A vehicle seat can be configured to make it easier for passengers to get into or out of the vehicle in two ways. First, the seat can be pushed forward along a rail on the floor of the vehicle, producing more free space behind it to get in or out. Second, the backrest can be tilted forward about a horizontal pivot axis, so that the backrest, which is inclined slightly backward in the usual seat position, no longer obstructs the entry area. It is now easier for passengers to get to seats located behind the vehicle seat arrangement.

Getting in or out is further facilitated by the fact that when the backrest is tilted forward in its entry position, it can be locked. This makes it unnecessary for the passenger to keep pressing the backrest forward when getting in or out, and prevents unwanted, premature righting of the backrest. It can also be advantageous to lock the backrest in its entry position in order to have more storage space available when driving with the seat pushed forward into the entry position, when unwanted righting of the backrest should also be avoided.

However, conventional vehicle seat arrangements that are capable of performing this function have the disadvantage of being complex, elaborate, expensive to assemble, and liable to break down. Embodiments of the invention described herein addresses these and other problems.

SUMMARY OF THE INVENTION

A vehicle seat arrangement is disclosed herein. In one embodiment, the vehicle seat arrangement comprises a rail and is adapted for connection to a floor surface of a vehicle. A seat body is slidably mounted on the rail. The seat body has a seat bottom and a backrest that is pivotally connected to the seat bottom and that is configured to pivot with respect to the seat bottom about a pivot axis between a generally upright position and a forward-tilted entry position. The seat body is configured for movement along the rail between a sitting position and an entry position that is disposed forward of the sitting position. A blocking member is disposed proximate the rail. The blocking member is configured to obstruct the seat body from moving rearward of the sitting position. A locking mechanism is supported on the seat body. The locking mechanism is configured to move between a locked position wherein the locking mechanism restrains the seat back in the forward-tilted entry position and a release position wherein the seat back is released to return to the generally upright position. The locking mechanism is biased towards the locked position. In this embodiment, the backrest is configured to act as a lever such that when a force is applied to the backrest in a direction toward the sitting position, the force is transferred through the back rest to the locking mechanism. The force moves the locking mechanism from the locked position to the release position when the force exceeds a force that biases the locking mechanism towards the locked position.

BRIEF DESCRIPTION OF THE DRAWINGS

The description herein makes reference to the accompanying drawing wherein like reference numerals refer to like parts through the several views, and in which.

DETAILED DESCRIPTION OF THE PREFERRED EMBODIMENT(S)

Figure 1:
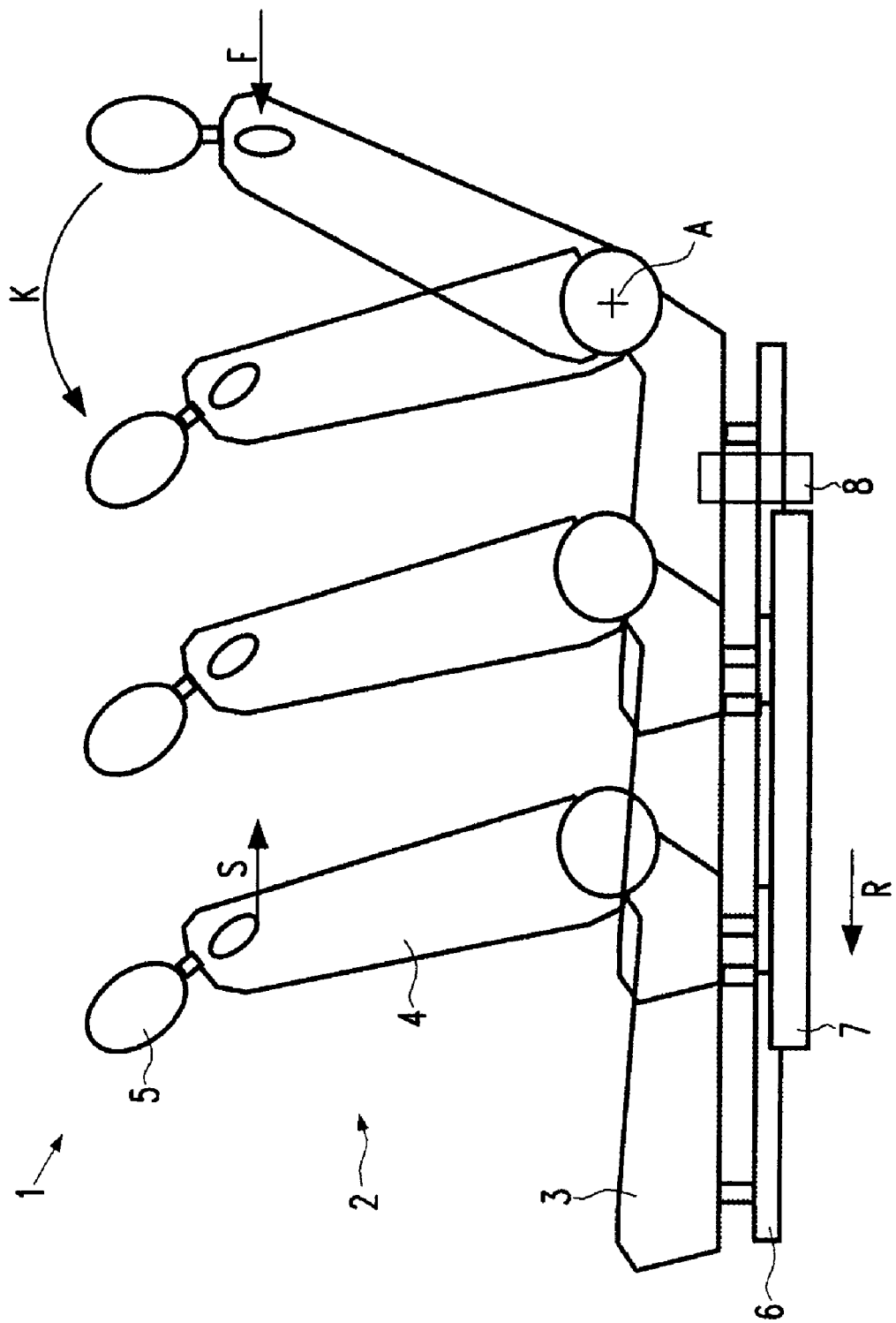
FIG. 1 is a side view illustrating an embodiment of a vehicle seat arrangement made in accordance with the teachings of the present invention.

Detailed embodiments of the present invention are disclosed herein; however, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

In an embodiment of a vehicle seat arrangement according to one non-limiting aspect of the invention, the backrest or headrest connected with the backrest is the control by means of which a user can push a seat body out of a position that facilitates ingress and into a sitting position. The backrest or headrest connected with the backrest can simultaneously serve as the control to release the locking mechanism and bring the backrest out of a forward-tilted entry position into an upright sitting position. The advantage of this arrangement is that no other controls have to be provided, making the control mechanism and the entire vehicle seat arrangement much less complex. It is also advantageous that the backrest represents a control that is easily accessible for the user.

The embodiment of the vehicle seat arrangement described herein is further characterized in that the backrest is part of a lever mechanism that transfers a pushing force exerted by a user to the locking mechanism where it acts as a releasing force. The leverage of the backrest means that when the user exerts the pushing force, he need only expend comparatively little force to overcome a retention force that might be clearly greater, and unlock the locking mechanism.

Moreover, the embodiment of the vehicle seat arrangement described herein is characterized in that until a blocking device is reached, the forces of inertia and/or friction counteracting the displacement of the seat body along the rail are smaller than the retention force of the locking mechanism. This feature offers substantial advantages when the seat body is brought out of the position for easier entry into the sitting position. To do this, the user grasps the backrest (or the headrest connected with it), and applies a pushing force to the backrest directed backward in direction of travel. Since the forces of inertia and friction when the seat body is displaced are smaller than the retention force of the locking mechanism, the pushing force applied to the seat body makes the seat body move along the rail out of the entry position in the direction of the sitting position that is located further back, without unlocking the locking mechanism, since unlocking is opposed by greater resistance than displacement of the seat body along the rail. However, if the seat body reaches the sitting position when being pushed, the blocking device prevents further displacement of the seat body. From this time on, further displacement of the seat body is opposed by a much higher resistance. However, the retention force of the locking mechanism, which counteracts the unlocking of the locking mechanism, has not changed. The "holding" of the seat body by means of the blocking device means that the further pushing force applied to the backrest now increases on the locking mechanism and overcomes the retention force, so that the locking mechanism unlocks and the pushing force returns the backrest back to its upright sitting position. Consequently, using very simple design means, the embodiment of the vehicle seat arrangement described herein causes a constant pushing force exerted by the user first to push back the seat body into the sitting position, and then to unlock the locking mechanism, in order to tilt up the backrest, and to do so in a predetermined sequence. Of course the vehicle seat arrangement leaves open the possibility of folding up the backrest to the generally upright sitting position before the blocking arrangement and sitting position are reached. This can be achieved, for example, by the user folding the backrest up very quickly, before the seat with its comparatively high inertia begins to move along the rail. Alternatively, the user may hold the seat component while he folds up the backrest.

In some embodiments, the locking mechanism comprises a pawl that can pivot about a pin. Pivoting the pawl about the pin makes it simple to take it out of the unlocked position and put it into the locked position. The pin can define a pivot axis for the pawl that is parallel to the pivot axis of the backrest. This arrangement may facilitate the pivoting or tilting of the backrest to lock or unlock the locking mechanism. In addition, the backrest provides good leverage when transmitting the pushing force as a releasing force on the locking mechanism. The pin and the pawl pivoting about the pin can be associated with either the seat component or the backrest.

For locking, the pawl can have a recess on it, which can engage in a releasable manner with a locking bolt, a tooth, a pin, a projection, or something similar. This allows the locking mechanism to be built without great complexity.

In some embodiments, the pawl may be biased to rotate about the pin. This bias could be directed in such a way that the pawl—depending on the position of the backrest at the moment—is urged towards the locked position.

If the pawl is biased towards the locking position, the bias can determine the strength of the retention force that must be overcome to unlock the locking mechanism.

In some embodiments, a helical spring or a coil spring may be provided in order to bias the pawl to rotate about the pin.

On some embodiments, the pawl may extend backward starting from the pin, i.e., opposite the vehicle's usual direction of travel. This makes it easier to bias the pawl into the locking position. In other embodiments, the pawl may extend forward starting from the pin.

Operation of the embodiment of the vehicle seat arrangement described herein can be further facilitated by keeping the pawl out of contact with the locking bolt (or another locking element) when the backrest is in the sitting position. This prevents the development of unwanted noise, e.g., clattering, between the pawl and the locking element, while the seat is in its sitting position. In such embodiments, the tilting of the backrest may be facilitated because no frictional forces arise between the pawl and the locking element.

In at least one embodiment of the vehicle seat arrangement, the pawl is not in contact with the locking bolt over a large part of the backrest's tilting movement from its sitting position to its entry position. For example, the pawl may be out of contact with the locking bolt over at least 50% of the backrest's tilting travel. In other embodiments the pawl may be out of contact with the locking bolt over 70% or 80% of the backrest's tilting travel. This configuration eliminates friction between the pawl and the locking bolt during the time when the two elements are not in contact with one another. The absence of friction can reduce the force a user needs to apply to tilt the backrest.

If the pawl is biased towards a locked position, a stop can be provided which limits the deflection of the pawl about the pin. This makes it very simple to ensure that the pawl does not come into contact with the locking bolt too early when the backrest is tilted.

In some embodiments, a contact section of the pawl may touch the locking bolt at the moment when the backrest reaches a predetermined position during its forward tilting movement. The moment at which this contact takes place can thus be selected by the shape and arrangement of the pawl.

In some embodiments, the contact section of the pawl makes contact with the locking bolt at an angle of 55° to 70° relative to the tilting movement of the backrest. In other embodiments, the angle may be 60° to 65°. In still other embodiments, the angle may be approximately 63°. The pawl may be shaped in such a way that it can be deflected by contact with the locking bolt to be put into its locked position. This allows the pawl to get into its locked position in a "passive" way.

The pawl can also have a retaining section, against which the locking bolt lies when the locking mechanism is in its locked position. The shape of this retaining section and its orientation relative to the locking bolt can be factors in determining the retention force of the locking mechanism, along with the bias of the pawl.

In some embodiments, the retaining section of the pawl may make contact with the locking bolt at an angle of 25° to 35° relative to the tilting movement of the backrest. In other embodiments, the angle may be 30°. These angular ranges make the retention force sufficiently large, but overcomable by the releasing force. Other angular ranges may also be acceptable. The pawl may be deflected into its unlocked position by making contact with the locking bolt. If a sufficiently large releasing force acts on the pawl, it could, for example, slide on the locking bolt by means of its retaining section, to be deflected in this way and free the locking bolt.

In an embodiment of the vehicle seat arrangement the seat body can be moved out of its sitting position through the stable entry position, to allow the locking mechanism to move into its locked position. In this embodiment, the backrest is "overtilted", before it moves back into the locked entry position.

FIG. 1 shows an embodiment of a vehicle seat arrangement 1 according to the invention. It comprises a seat body 2 with a seat component 3, a backrest 4, and a headrest 5 connected with backrest 4.

Beneath seat component 3, there is at least one sliding block 6, by means of which seat body 2 can be pushed in the vehicle's longitudinal direction along a rail 7 fastened to the floor of the vehicle. Seat body 2 may be pushed along rail 7 between a sitting position shown on the right in FIG. 1 and an entry position lying further forward in the vehicle's direction of travel, shown on the left in FIG. 1. Moving seat body 2 into the entry position increases the space available behind seat body 2. This increased space can be used to make it easier for a passenger to enter or exit seats located further back in the vehicle, for example a second or third row of seats in a passenger vehicle. The seat could also be moved to increase storage space.

The additional available space behind seat body 2 can be increased even more and it can be made even easier for the passenger to get in by allowing backrest 4 of seat body 2 to tilt forward with respect to the seat component 3 about a horizontal pivot axis A, as is indicated by arrow K. This takes the backrest out of its sitting position, shown on the right, in which it is upright or inclined slightly backward, and puts it into its entry position, in which it is tilted forward. To do this, the user first, if necessary, releases a locking device of backrest 4, which under some circumstances might also simultaneously release the locking of sliding block 6 on rail 7, thus making possible the subsequent movement of seat body 2. After releasing this locking device, the user tilts backrest 4 forward by applying a force F to the top of backrest 4 or the headrest. As soon as backrest 4 has been tilted forward in the direction of arrow K into its entry position, the user pushes seat body 2 forward by continuing to apply force F until seat body 2 is in its entry position shown on the left. To keep backrest 4 in its forward-tilted entry position, a locking mechanism 10 is provided, which locks backrest 4 in its entry position. This locking mechanism is described in detail further below.

In order to bring seat body 2 of the vehicle seat arrangement 1 according to the invention out of the entry position shown on the left in FIG. 1 back into its initial position, the user grasps the top of backrest 4 or headrest 5, where he applies a pushing force S directed backward with respect to the vehicle's direction of travel, i.e., toward the sitting position. As is also described further below, a component of this pushing force S is transferred through backrest 4, which serves as a lever, to the locking mechanism, where the force acts as a releasing force. The forces of inertia and/or friction R counteracting the displacement of seat body 2 along rail 7 are smaller than the locking mechanism's retention force, which has to be overcome to release the locking device. Consequently, the pushing force S applied by the user causes seat body 2 to move backward along rail 7. As soon as seat body 2 has reached its original sitting position, a blocking device or blocking arrangement 8 comes into play, to prevent further displacement of seat body 2 beyond the sitting position. The blocking arrangement 8 can be a block on rail 7, which sliding block 6 of seat body 2 strikes, preventing further movement. Alternatively, blocking arrangement 8 could also be realized with the help of sensors, for example (magnetic) position sensors, which recognize when the sitting position has been reached and trigger the blocking of further movement of seat body 2. Blocking arrangement 8 gives the vehicle seat arrangement 1 a "memory function", since with its help seat body 2 "remembers" its previous sitting position and reassumes it after displacement. In some embodiments, blocking arrangement 8 could be adjustable, in order to set a certain sitting position as an initial position, depending on the needs of a passenger (memory function).

Figure 2:
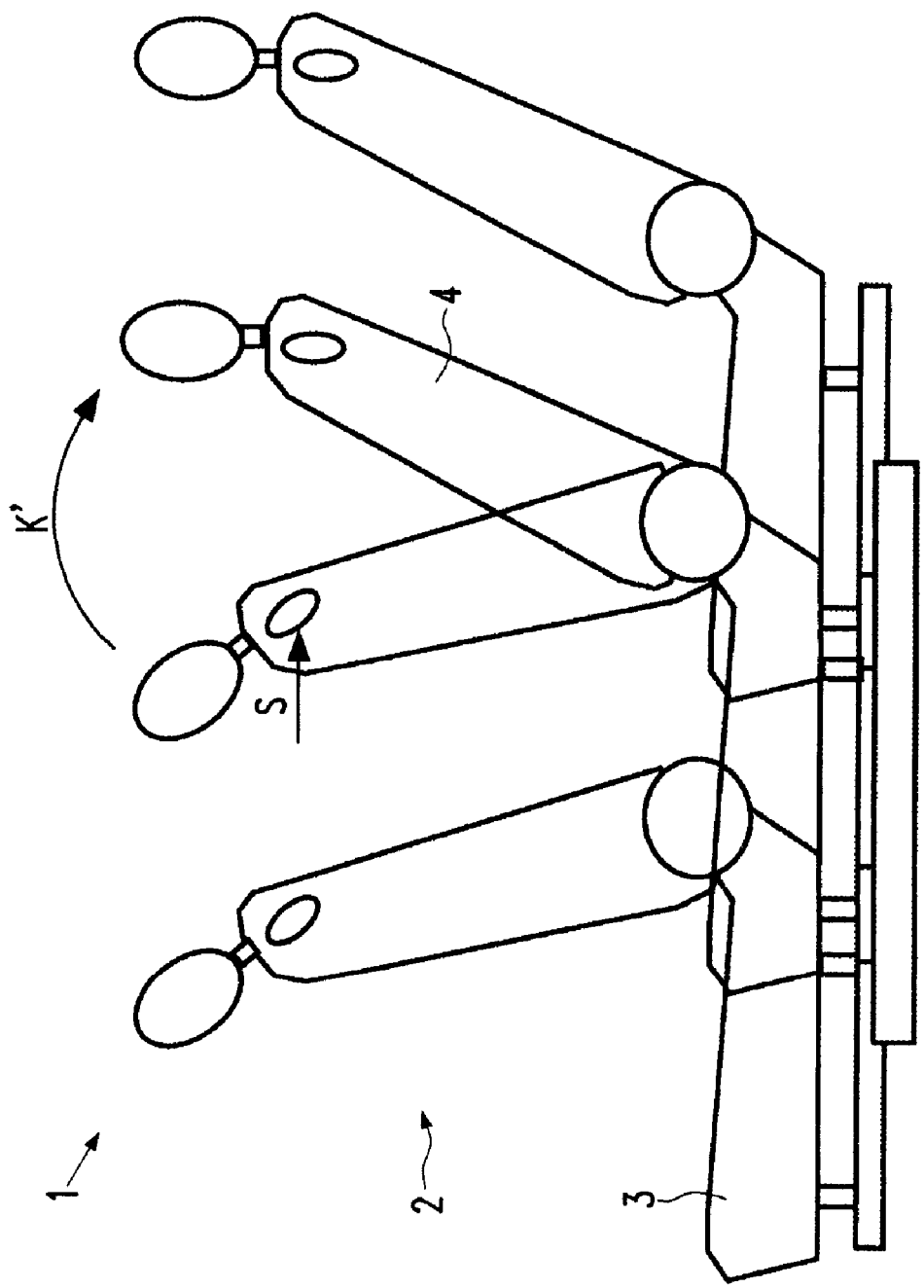
FIG. 2 is a side view illustrating the embodiment of FIG. 1 during an alternative sequence of movements.

FIG. 2 shows the vehicle seat arrangement 1 of FIG. 1 during another sequence of movements. After seat body 2 has been pushed about half way back from the entry position towards the sitting position and before it strikes blocking arrangement 8, the user deliberately fixes seat component 3 and prevents its further rearward displacement. The pushing force S applied beyond this point now returns backrest 4 to its upright sitting position, as is indicated by arrow K'. A user could bring about this premature raising of backrest 4 by applying a large, rapidly increasing pushing force S, whose rapid increase cannot be matched by rearward displacement of seat body 2, due to seat body 2's inertia. The pushing force S then acts as a releasing force on the locking mechanism, unlocks the locking mechanism, and tilts backrest 4 up into its upright sitting position.

Figure 3:
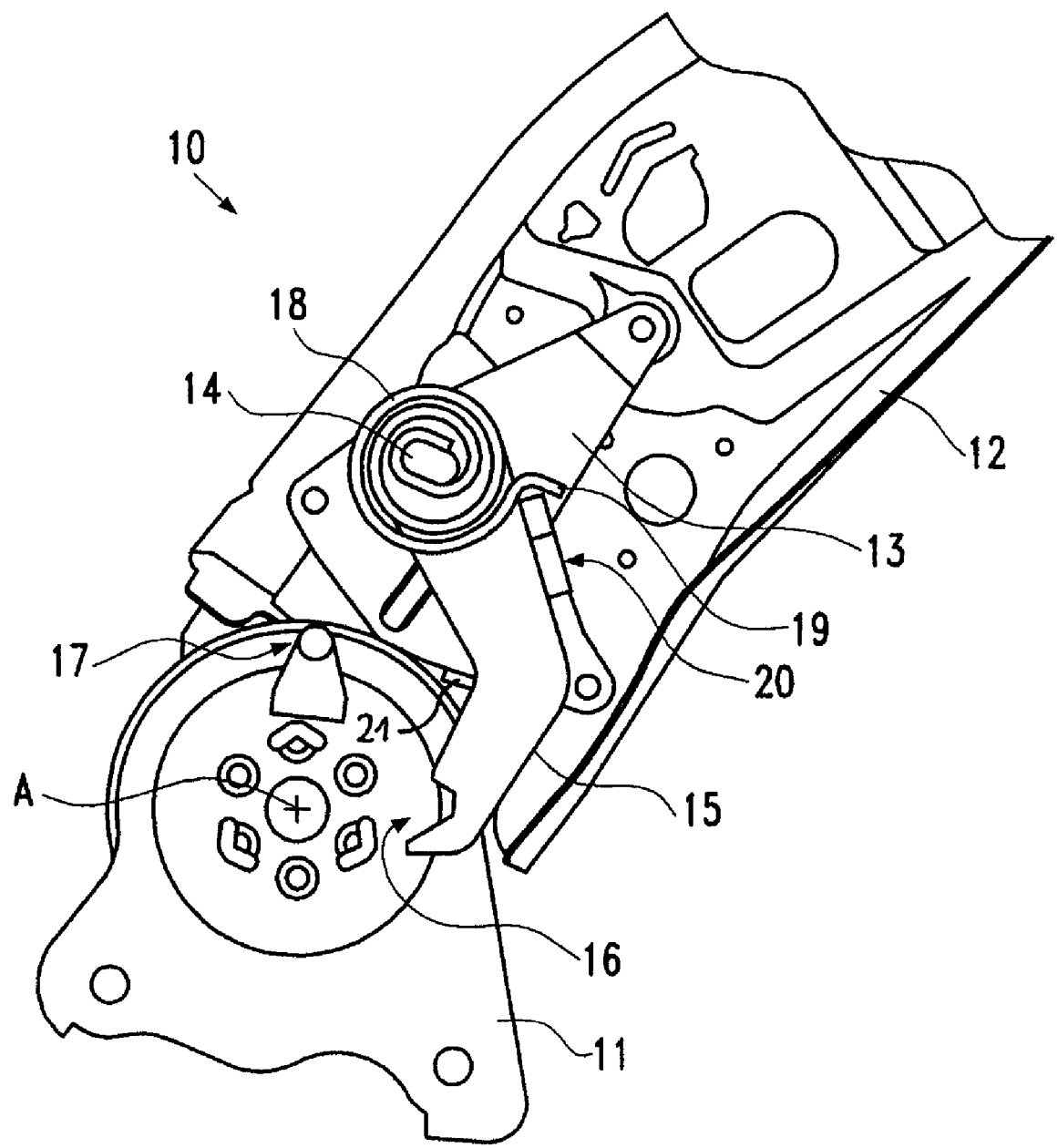
FIG. 3 is a side view illustrating a locking mechanism for use with the vehicle seat arrangement of FIG. 1 while the vehicle seat arrangement is in a sitting position.

FIG. 3 shows an embodiment of a locking mechanism 10, which is configured to lock seat body 2 in its forward-tilted entry position in such a way that it can be released.

A mounting flange 11 is connected with seat component 3 and defines the pivot axis A about which the frame or supporting structure 12 of backrest 4 can pivot relative to seat component 3. Frame 12 of backrest 4 has a triangular plate 13 fastened to it, which in turn has a pin 14 fastened to it. A pawl 15 can pivot about pin 14. In this embodiment, the pawl 15 consists of a flat piece of metal having an angular shape. Pawl 15 has, at its end facing away from pin 14, a recess 16 with which it can engage with a locking bolt 17 fastened to flange 11, as described later.

Pin 14 has a helical spring 18 wound around it. The front end 19 of helical spring 18 presses against a flange 20 on pawl 15, to bias pawl 15 in the clockwise direction in the arrangement shown in FIG. 3.

In FIG. 3, backrest 4 of vehicle seat arrangement 1 is in its upright sitting position. The bias imparted by helical spring 18 forces pawl 15 against a stop 21 fastened to frame 12, preventing further deflection of pawl 15 in the clockwise direction. This also prevents contact between pawl 15 and locking bolt 17. Consequently, locking mechanism 10 is depicted in its unlocked position.

Figure 4:
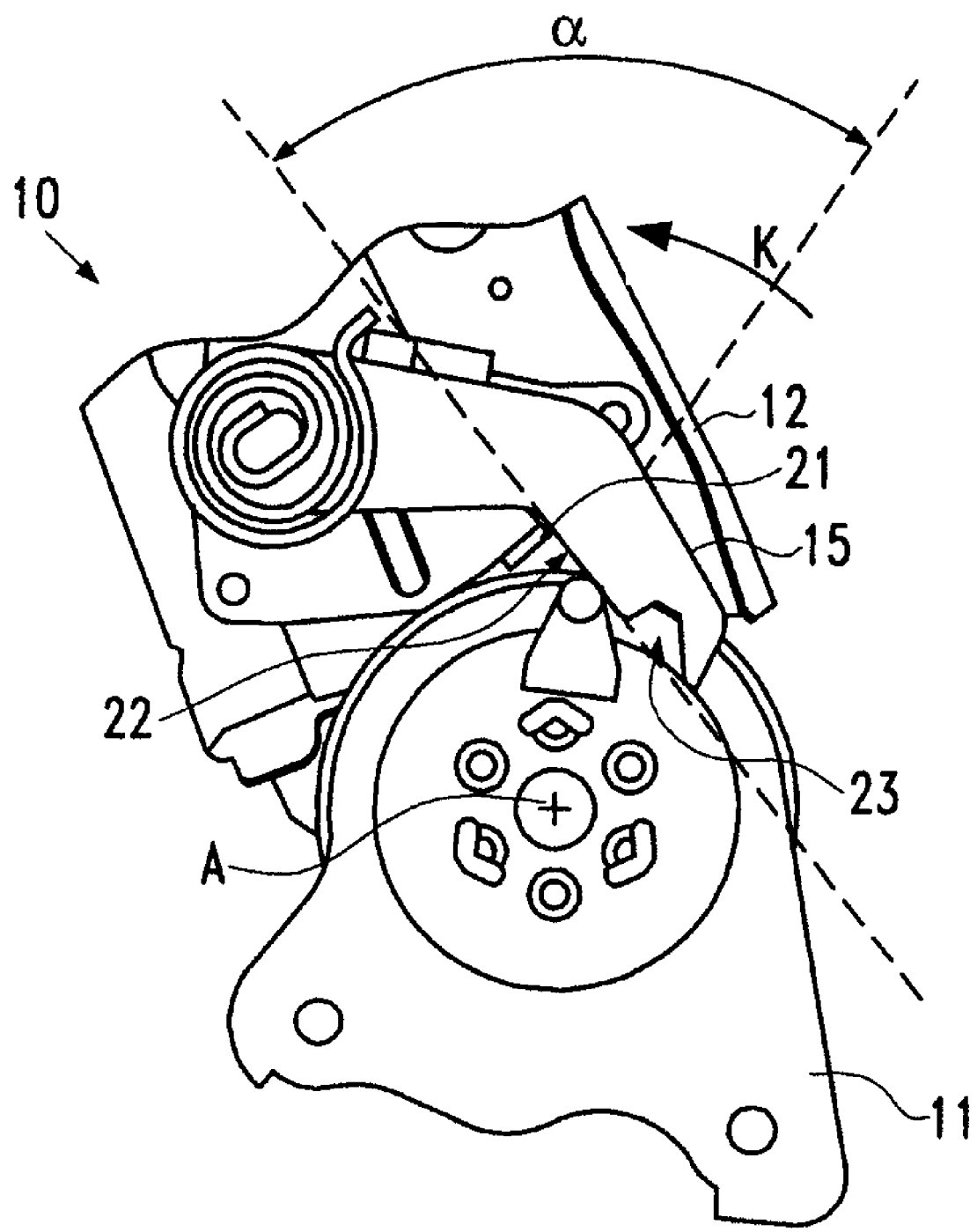
FIG. 4 is a side view illustrating the locking mechanism of FIG. 3 while a backrest of the vehicle seat arrangement is being tilted forward.

FIG. 4 shows locking mechanism 10 in a situation in which backrest 4 of seat body 2 has already been tilted a certain distance forward in direction K. In particular, FIG. 4 shows locking mechanism 10 at the point in time when the contact surface 22 of pawl 15 first comes into contact with locking bolt 17. Relative to the instantaneous direction of movement of pawl 15 due to the pivoting movement of backrest 4 about pivot axis A, the contact surface 22 of pawl 15 strikes locking bolt 17 at a contact angle $\alpha$ of about 63°. From this point in time on, the contact between locking bolt 17 and pawl 15 prevents pawl 15 from continuing to participate in the tilting movement of backrest 4. In FIG. 4 it can be seen that for this reason pawl 15 has already separated from stop 21. Until pawl 15 makes contact with locking bolt 17, there are no frictional forces between these two elements, which might otherwise increase the effort required to tilt backrest 4.

Figure 5:
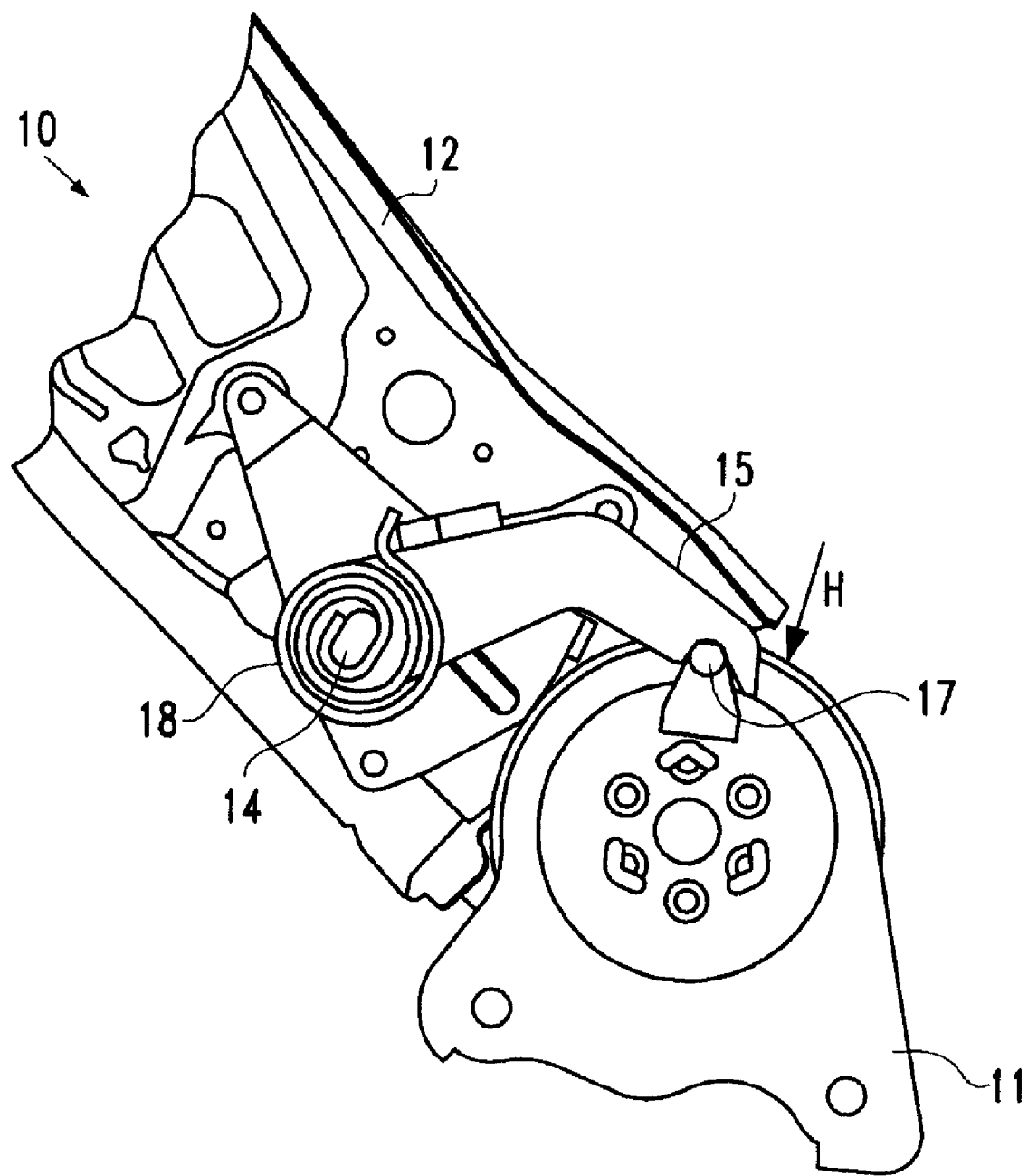
FIG. 5 is a side view illustrating the locking mechanism in FIG. 3 in the locked position.

FIG. 5 shows locking mechanism 10 in its locked position, in which it holds backrest 4 of vehicle seat arrangement 1 in the forward-tilted entry position. Tilting the backrest 4 and its frame 12 beyond the position shown in FIG. 4 makes the contact surface 22 of pawl 15 slide up on locking bolt 17, pawl 15 having been deflected counterclockwise about pin 14, in the direction opposite the bias exerted by helical spring 18. This makes pawl 15 "slip" over locking pin 17 until the latter goes into recess 16. The bias of helical spring 18 now makes pawl 15 move clockwise again and holds locking bolt 17 in the recess 16. The bias of spring 18 holds pawl 15 on locking bolt 17 with a certain retention force H that has to be overcome in order to release the locking device.

Figure 6:
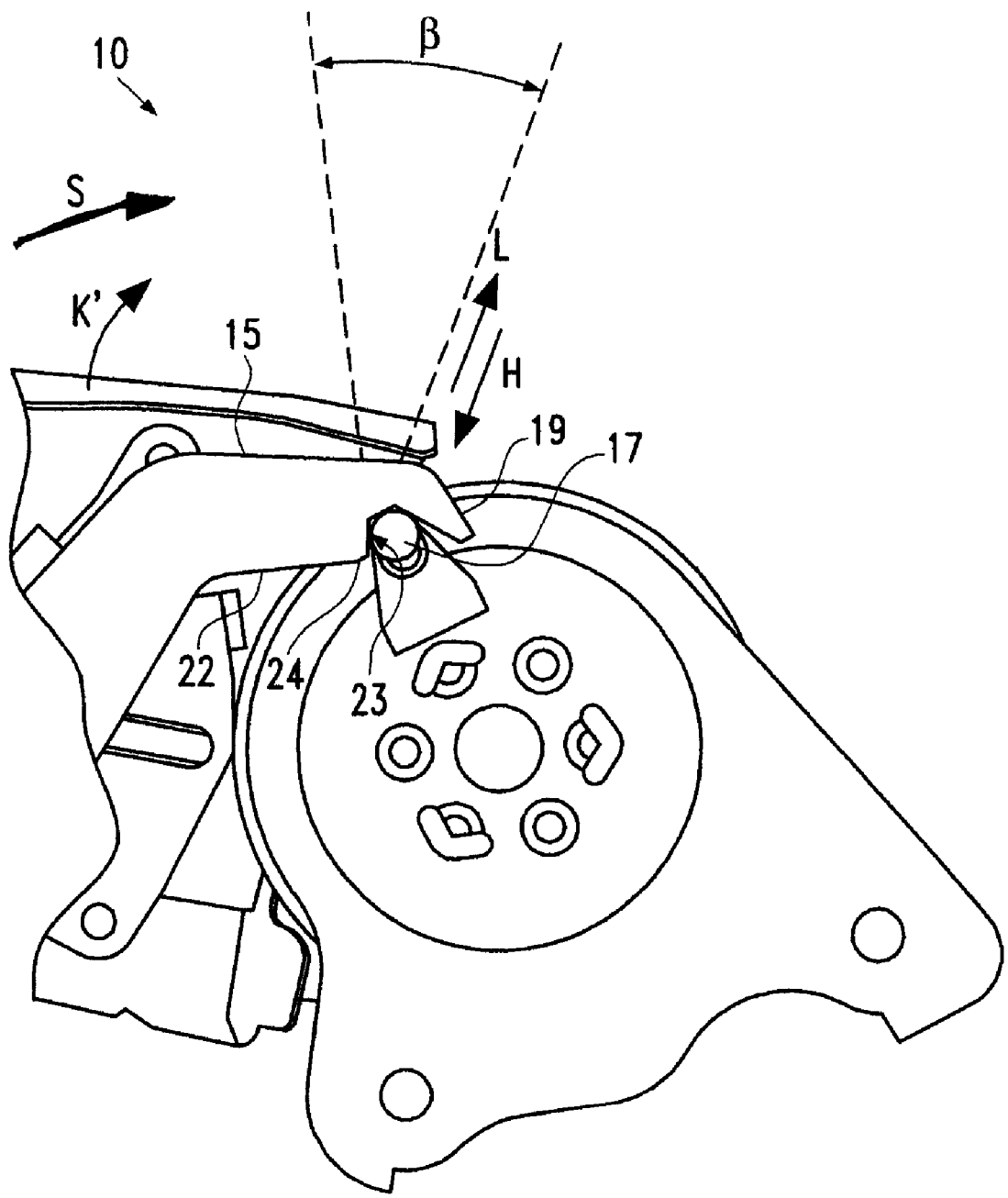
FIG. 6 is a side view illustrating the unlocking of the locking mechanism of FIGS. 3 through 5.

The unlocking or releasing of locking mechanism 10 is shown in FIG. 6. As mentioned, the user grasps the top end of backrest 4 with a pushing force S directed toward the sitting position. This pushing force S is transferred through backrest 4 or frame 12 of backrest 4 not only to seat component 3 for pushing along rail 7, but also to locking mechanism 10. In particular, a component of pushing force S is applied to backrest 4 in such a way that it is forced to make a pivoting movement K' about pivot axis A into the upright sitting position. This force on frame 12 of backrest 4 is transferred through pin 14 to pawl 15. Finally, at the front end 19 of pawl 15, a component of this force acts as a releasing force L, which is directed opposite the retention force H of locking mechanism 10. This retention force H of locking mechanism 10 is produced by locking bolt 17 lying against a retaining section 23 of pawl 15. In the illustrated embodiment, retaining section 23 comprises an inner section of recess 16 (see FIG. 4). Retaining section 23 and locking bolt 17 lie against one another at a contact angle β of about 30° relative to the pivoting movement K' of backrest 4. When contact angle α is sufficiently large, retention force H is developed (which can be further increased with a greater contact angle β). In some embodiments, a contact angle of about 30° is suitable for the process of unlocking the locking mechanism 10. In some embodiments, as soon as the seat body 2 being pushed along rail 7 reaches blocking arrangement 8, it is prevented from further displacement. Pushing force S on seat component 3 is now counteracted by very great resistance. Pushing force S is now more intensely introduced through backrest 4 into locking mechanism 10, where it increases releasing force L. At a certain point in this process, releasing force L becomes the same as or greater than retention force H of locking mechanism 10. At this point in time latch 15 with its retaining section 23 begins to slide up onto locking bolt 17. When this happens, pawl 15 is deflected against the bias of helical spring 18, until the projecting edge 24 between contact section 22 and retaining section 23 slides over locking bolt 17, unlocking the locking mechanism 10. After backrest 4 is unlocked, it can be pivoted without hindrance into its sitting position and be locked there, if necessary, by another mechanism.

Starting from the described embodiment, the vehicle seat arrangement 1 according to the invention can be modified in many ways. In this connection it was already mentioned that another locking device can also be provided when seat body 2 is in the sitting position. In some embodiments, pawl 15 may be biased by a spiral spring. It would also be possible for pawl 15 to be on mounting flange 11 of the seat component 3 and locking bolt 17 to be on frame 12 of backrest 4. Of course the indicated contact angles α, β could also be varied.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat arrangement comprising:
   a rail adapted for connection to a floor surface of a vehicle;
   a seat body slidably mounted on the rail, the seat body having a seat component, a pin, a locking bolt, and a backrest pivotally connected to the seat component and configured to pivot with respect to the seat component about a pivot axis between a generally upright position and a forward-tilted entry position, the seat body being configured for movement along the rail between a sitting position and an entry position disposed forward of the sitting position;
   a blocking member disposed proximate the rail, the blocking member configured to obstruct the seat body from moving rearward of the sitting position; and
   a locking mechanism supported on the seat body, the locking mechanism being configured to move between a locked position wherein the locking mechanism restrains the seat back in the forward-tilted entry position and a release position wherein the seat back is released to return to the generally upright position, the locking mechanism being biased towards the locked position and including a pawl configured to pivot about the pin, the pawl having a surface that defines a recess configured to releaseably engage the locking bolt;
   wherein the backrest is configured to act as a lever such that when a force is applied to the backrest in a direction toward the sitting position, the force is transferred through the backrest to the locking mechanism and wherein the force moves the locking mechanism from the locked position to the release position when the force exceeds a force biasing the locking mechanism towards the locked position.

2. The vehicle seat arrangement of claim 1 wherein the locking bolt is configured to move the pawl into a locked position.

3. The vehicle seat arrangement of claim 1 wherein the pin defines a pivot axis and wherein the pin is disposed on the seat body such that the pivot axis of the pin is parallel to the pivot axis about which the backrest pivots.

4. The vehicle seat arrangement of claim 1 wherein the pin is supported on the seat component.

5. The vehicle seat arrangement of claim 1 wherein the locking bolt is configured to move the pawl into an unlocked position.

6. The vehicle seat arrangement of claim 1 wherein the pawl is biased to rotate about the pin.

7. The vehicle seat arrangement of claim 1 wherein the pawl is biased towards a locked position and wherein the bias of the locking mechanism towards the locked position is determined by the bias of the pawl towards the locked position.

8. The vehicle seat arrangement of claim 1 further comprising a helical spring disposed proximate the pawl, the helical spring biasing the pawl to rotate about the pin.

9. The vehicle seat arrangement of claim 1 wherein the pawl extends in a rearward direction starting from the pin.

10. The vehicle seat arrangement of claim 1 wherein the locking mechanism further includes a stopping member and wherein the pawl is biased against the stopping member.

11. The vehicle seat arrangement of claim 1 wherein the pawl does not contact the locking bolt over at least 50% of a path followed by the backrest as the backrest moves from the generally upright position to the forward-tilted position.

12. The vehicle seat arrangement of claim 1 wherein movement of the seat body from the sitting position to the entry position moves the locking mechanism into the locked position.

13. A vehicle seat arrangement comprising:
    a rail adapted for connection to a floor surface of a vehicle;
    a seat body slidably mounted on the rail, the seat body having a seat component, a pin, a locking bolt, and a backrest pivotally connected to the seat component and configured to pivot with respect to the seat component about a pivot axis between a generally upright position and a forward-tilted entry position, the seat body being configured for movement along the rail between a sitting position and an entry position disposed forward of the sitting position;
    a blocking member disposed proximate the rail, the blocking member configured to obstruct the seat body from moving rearward of the sitting position; and
    a locking mechanism supported on the seat body, the locking mechanism being configured to move between a locked position wherein the locking mechanism restrains the seat back in the forward-tilted entry position and a release position wherein the seat back is released to return to the generally upright position, the locking mechanism being biased towards the locked position and including a pawl configured to pivot about the pin;

wherein the backrest is configured to act as a lever such that when a force is applied to the backrest in a direction toward the sitting position, the force is transferred through the backrest to the locking mechanism and wherein the force moves the locking mechanism from the locked position to the release position when the force exceeds a force biasing the locking mechanism towards the locked position and wherein the locking bolt is configured to move the pawl into a locked position.

14. The vehicle seat arrangement of claim 13 wherein a surface of the pawl defines a recess configured to releaseably engage the locking bolt.

15. The vehicle seat arrangement of claim 13 wherein a surface of the pawl defines a recess, the recess being configured to releaseably engage the locking bolt, and wherein the pawl does not contact the locking bolt when the backrest is in the generally upright position.

16. The vehicle seat arrangement of claim 13 wherein bias of the locking mechanism towards the locked position is determined by bias of the pawl towards the locked position and by a relative orientation of the locking bolt to the retaining section.

17. A vehicle seat arrangement comprising:
a rail adapted for connection to a floor surface of a vehicle;
a seat body slidably mounted on the rail, the seat body having a seat component, a pin, a locking bolt, and a backrest pivotally connected to the seat component and configured to pivot with respect to the seat component about a pivot axis between a generally upright position and a forward-tilted entry position, the seat body being configured for movement along the rail between a sitting position and an entry position disposed forward of the sitting position;
a blocking member disposed proximate the rail, the blocking member configured to obstruct the seat body from moving rearward of the sitting position; and
a locking mechanism supported on the seat body, the locking mechanism being configured to move between a locked position wherein the locking mechanism restrains the seat back in the forward-tilted entry position and a release position wherein the seat back is released to return to the generally upright position, the locking mechanism being biased towards the locked position and including a pawl configured to pivot about the pin, the pawl defining a contact section for engaging the locking bolt, wherein the pawl is configured to contact the locking bolt when the backrest moves to a predetermined position as the backrest tilts forward;

wherein the backrest is configured to act as a lever such that when a force is applied to the backrest in a direction toward the sitting position, the force is transferred through the backrest to the locking mechanism and wherein the force moves the locking mechanism from the locked position to the release position when the force exceeds a force biasing the locking mechanism towards the locked position.

18. The vehicle seat arrangement of claim 17 wherein the pawl includes a retaining section and wherein the locking bolt contacts the retaining section when the pawl is in a locked position.

19. The vehicle seat arrangement of claim 18 wherein the retaining section contacts the locking bolt at an angle of between 25 degrees and 35 degrees relative to a path followed by the backrest as the backrest tilts between the generally upright position and the forward-tilted position.

20. The vehicle seat arrangement of claim 17 wherein the pawl is configured such that the contact section contacts the locking bolt at an angle of between 55 degrees and 70 degrees relative to a path followed by the backrest as the backrest tilts between the generally upright position and the forward-tilted position.

* * * * *